United States Patent
Rutz et al.

(10) Patent No.: US 6,520,602 B2
(45) Date of Patent: Feb. 18, 2003

(54) GUIDE FOR AN ENDLESS CHAIN OF A TRACK-TYPE UNDERCARRIAGE

(75) Inventors: Werner Rutz, Queidersbach (DE); Ingo Nöske, Zweibrücken (DE)

(73) Assignee: Demag Mobile Cranes GmbH, Zweibrücken (DE)

( * ) Notice: Subject to any disclaimer, the term of this patent is extended or adjusted under 35 U.S.C. 154(b) by 0 days.

(21) Appl. No.: 09/866,126

(22) Filed: May 25, 2001

(65) Prior Publication Data

US 2001/0054844 A1 Dec. 27, 2001

(30) Foreign Application Priority Data

Jun. 26, 2000 (DE) .......................................... 100 31 021

(51) Int. Cl.[7] .......................... B62D 25/16; B62D 55/12
(52) U.S. Cl. ........................ 305/116; 305/195; 305/200
(58) Field of Search ................................. 305/116, 120, 305/121, 122, 123, 193, 194, 195, 196, 198, 200, 201

(56) References Cited

U.S. PATENT DOCUMENTS

| 4,229,053 A | | 10/1980 | Cline ........................... 305/28 |
| 5,738,361 A | * | 4/1998 | Landucci .................... 305/116 |
| 5,829,545 A | * | 11/1998 | Yamamoto et al. ......... 305/116 |
| 6,074,023 A | * | 6/2000 | Satou et al. ................. 305/116 |
| 6,206,492 B1 | * | 3/2001 | Moser ......................... 305/116 |
| 6,267,459 B1 | * | 6/2001 | Becker et al. ............... 305/116 |
| 6,364,437 B1 | * | 4/2002 | Phely .......................... 305/116 |

FOREIGN PATENT DOCUMENTS

JP 402204182 A * 8/1990 ................. 305/116

* cited by examiner

Primary Examiner—S. Joseph Morano
Assistant Examiner—Long Bao Nguyen
(74) Attorney, Agent, or Firm—Cohen, Pontani, Lieberman & Pavane

(57) ABSTRACT

A guide for a multi-link endless chain of a track-type undercarriage, especially for cranes, has an undercarriage support, at least one drive sprocket wheel provided with chain teeth, possibly an idler, and several track rollers. Each chain link of the endless chain has two guide webs which are symmetric to the center, spaced a certain distance apart, and extend in the travel direction. The webs have engaging surfaces which ride on opposed circumferential flanges on the drive sprocket wheel. A cog connects the two webs below the engaging surfaces and meshes with the chain teeth of the drive sprocket wheel. The guide has two parallel rails oriented in the travel direction of the endless chain, the inside surfaces of the rails coming to rest against the outside surfaces of the associated guide webs when the guide function is occurring. The guide is a compact pivoting part which is installed immediately in front of or behind the drive sprocket wheel, mounted in a frame part of the undercarriage support, and has two elongated web plates to serve as rails. When the pivoting part is in its working position, the rails are at least level with of the upper area of the guide webs of the individual chain links.

5 Claims, 4 Drawing Sheets

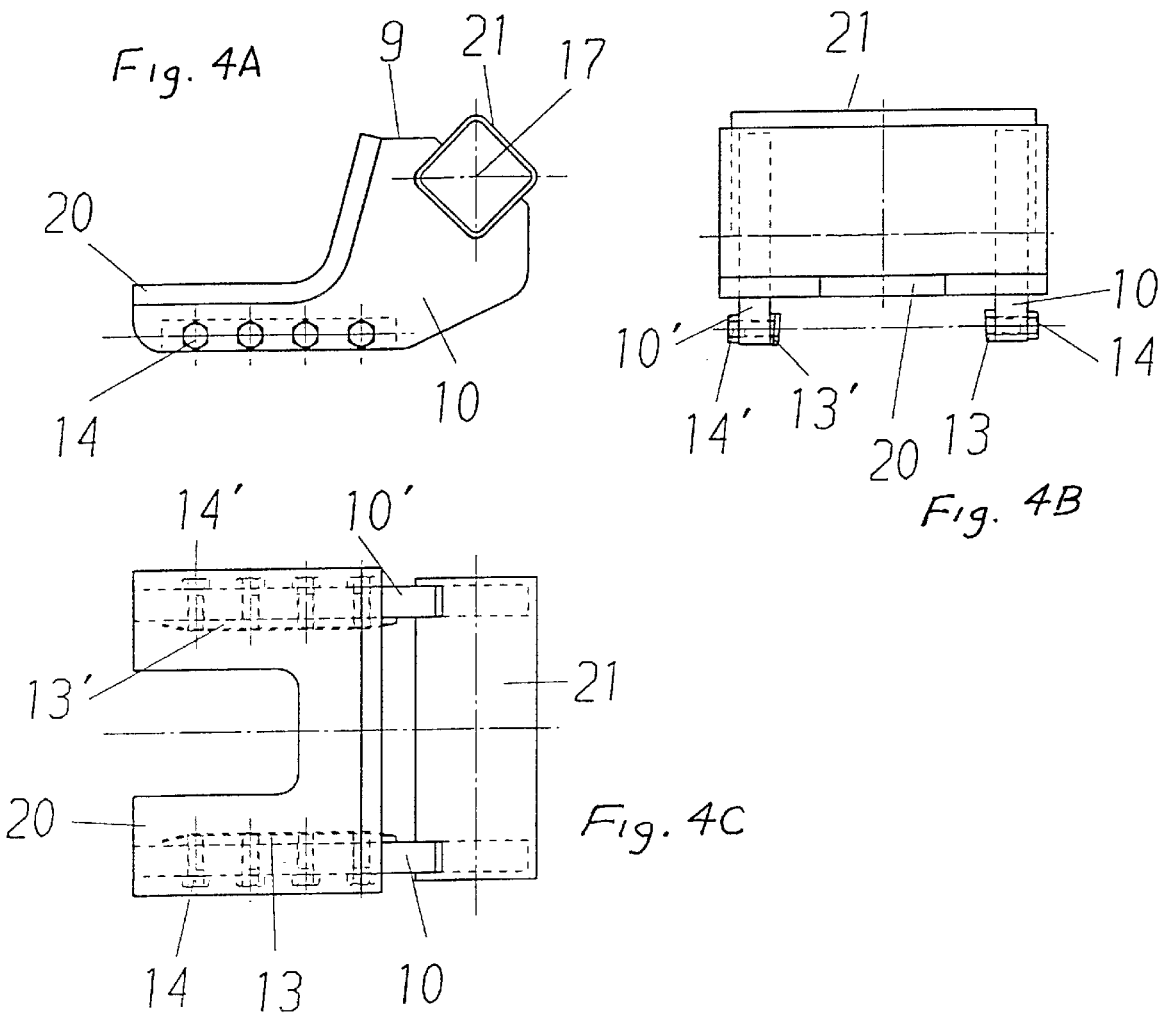

GUIDE FOR AN ENDLESS CHAIN OF A TRACK-TYPE UNDERCARRIAGE

BACKGROUND OF THE INVENTION

1. Field of the Invention

The invention pertains to a guide for an endless chain having multiple chain links on a track-type undercarriage for cranes.

2. Description of the Related Art

A guide of the general type in question is known from U.S. Pat. No. 4,229,053. The track-type undercarriage includes an undercarriage support, a drive sprocket wheel provided with chain teeth, an idler, an endless chain with multiple chain links, several track rollers, and a guide for the endless chain. Each link of the chain has two guide webs, which are symmetric to the center, spaced a certain distance apart, and aligned in the travel direction. The webs have engaging surfaces which ride on opposed circumferential flanges on the sprocket wheel. A cog connects the two webs below the engaging surfaces and meshes with the teeth of the drive sprocket wheel. The guide has a U-shaped carrier extending across the lower run, to the bottom of which individual elongated rails are detachably connected by bolts; the rails are held in mounting blocks. When the guide function is in effect, the inside surfaces of the rails come in contact with the outside surfaces of the guide webs.

This known design is very complicated in terms of design and represents a good deal of dead weight. In addition, the design makes it difficult to install or remove the track rollers.

SUMMARY OF THE INVENTION

The object of the invention is to provide a guide for the multi-link endless chain of a track-type undercarriage, which is compact in design and weighs less. Another object is to provide a guide which does not interfere with the installation and removal of the track rollers.

According to the invention, the guide, which is located immediately in front of or behind the drive sprocket wheel, is designed as a compact pivoting part, which is attached to a frame part of the undercarriage support. Two elongated webs serve as rails which, when the pivoting part is in its working position, are at least level with the upper area of the guide webs of the individual chain links.

This arrangement offers the advantage that the guide can be small and can be easily installed in the intermediate space between the last track roller and the drive sprocket wheel, whereas the rubber spring element provided in a recess prevents the pivoting part from rattling on the endless chain. The pivoting capacity offers the advantage that, when a chain link bends upward, the pivoting part can give way to allow this movement. Special attention has been paid to the ability to recognize the condition of the wearing plates. The fastening screws extend through the webs and are screwed into the wearing plates. If the wearing plates are worn down, the ends of the fastening screws are also worn away. The fastening screws thus are, unable to hold any longer and gradually fall out of the bore in the webs under the influence of the vibrations of the track-type undercarriage. This can be recognized immediately during the normal daily inspection, and new wearing plates can be mounted with new fastening screws to correct the problem.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 4A is a side view of the pivoting part;

FIG. 4B is front view of the pivoting part; and

FIG. 4C is a top view of the pivoting part.

DETAILED DESCRIPTION OF THE PRESENTLY PREFERRED EMBODIMENTS

Figure 1:
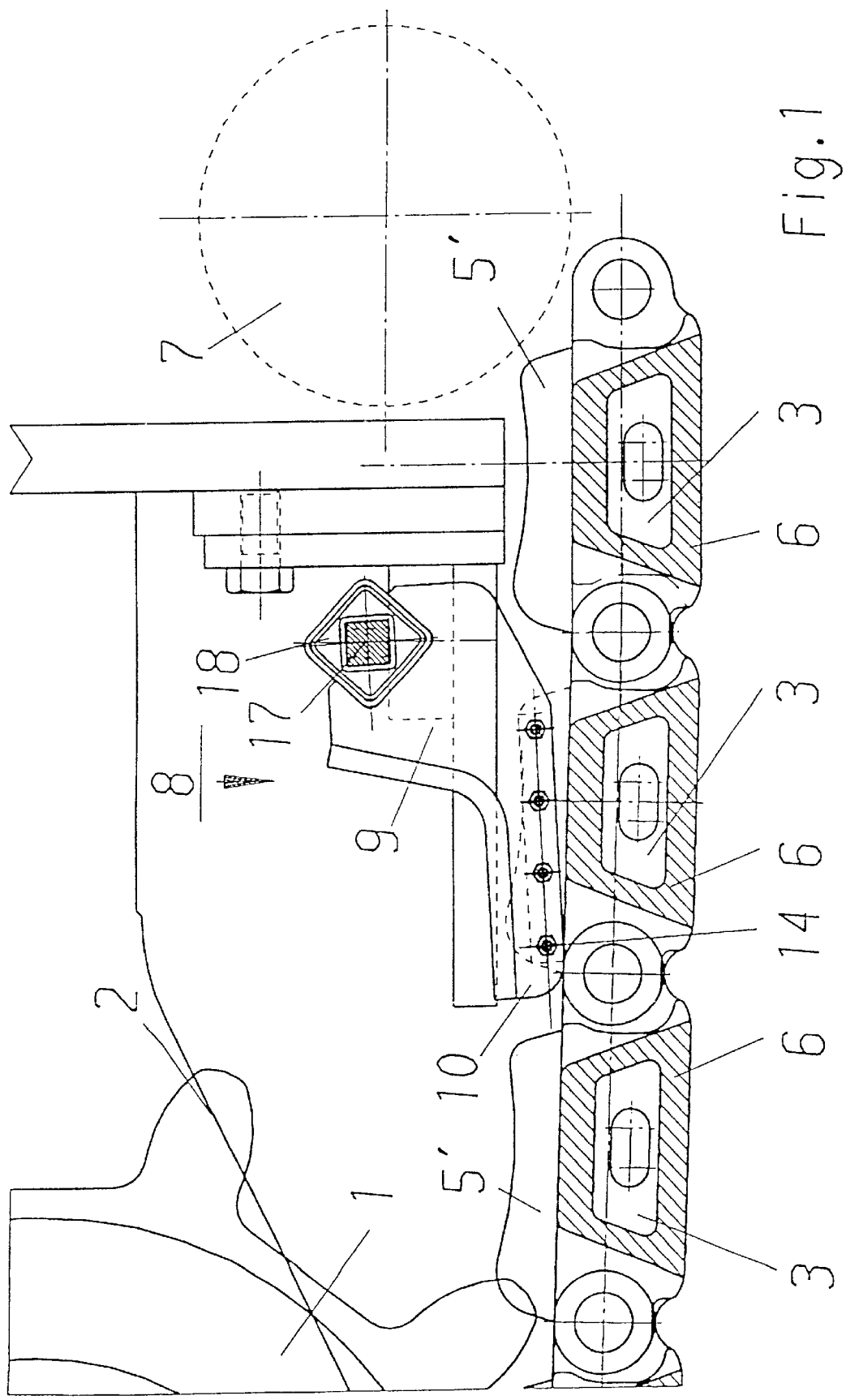
FIG. 1 shows a partial longitudinal section of a partial aspect of a track-type undercarriage with a guide designed in accordance with the invention in a working position.
Figure 2:
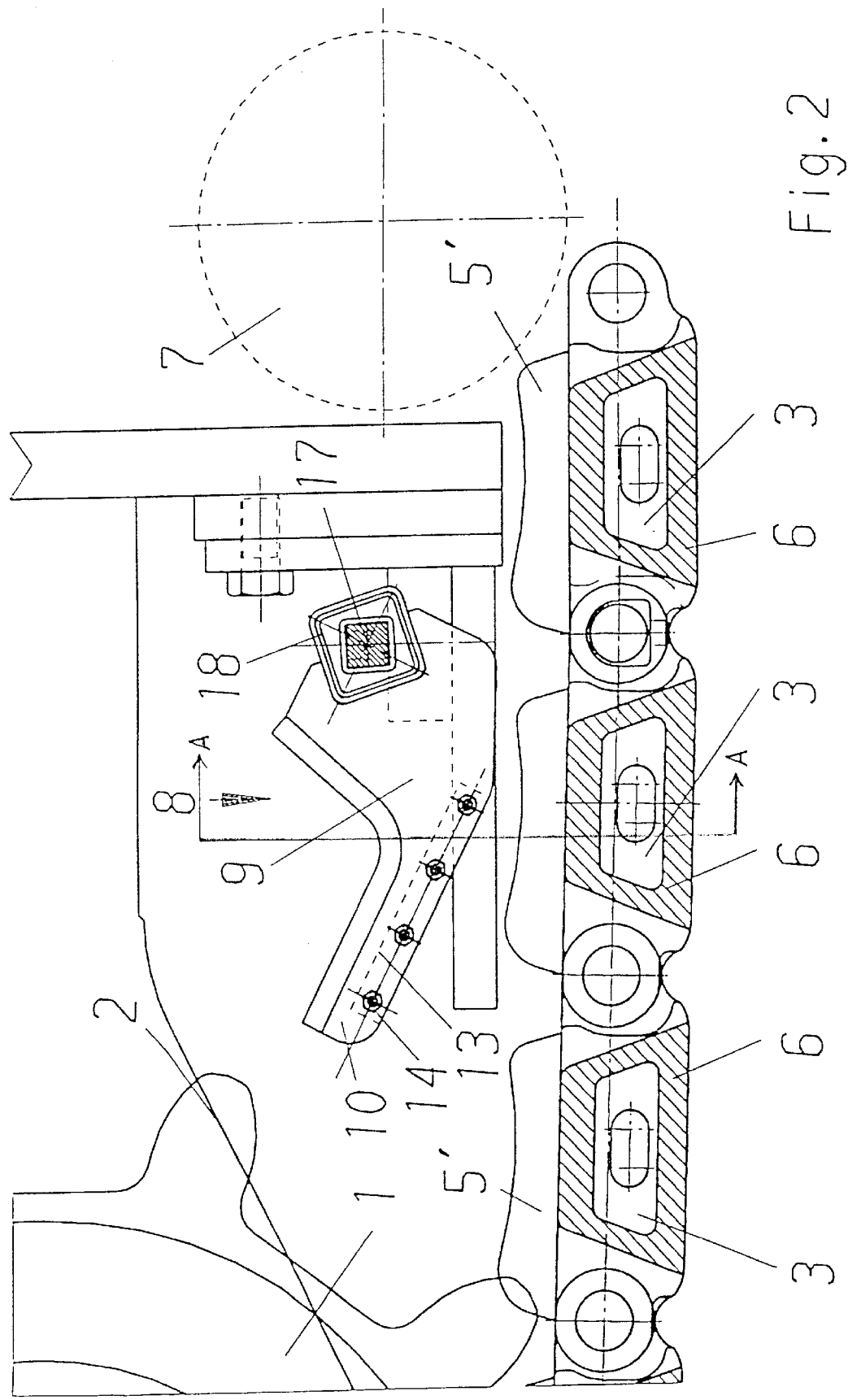
FIG. 2 shows a view similar to that of FIG. 1, except that the guide has pivoted.

Referring to FIG. 1, a part of the drive sprocket wheel 1 with the chain teeth 2 on it can be seen. These teeth mesh with the chain links 3 of an endless chain. The chain link 3, which is provided with base plate 4 (FIG. 3), has two guide webs 5, 5' in the middle, a certain distance apart, between which, somewhat lower down, is a cog 6, which meshes with the chain teeth 2 of the drive sprocket wheel 1.

Figure 3:
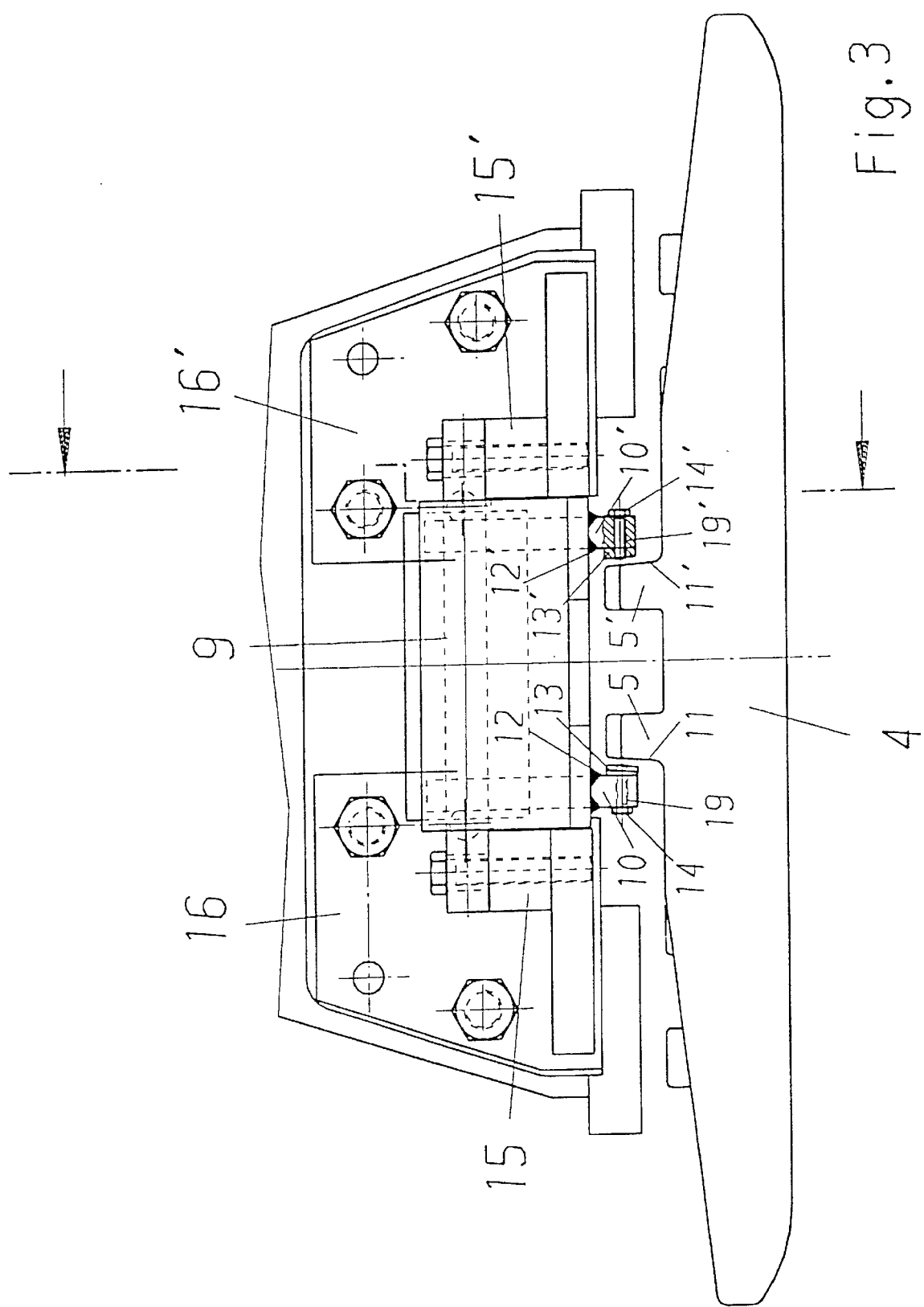
FIG. 3 shows a cross section along line A—A of FIG. 2.

Broken lines indicate the last track roller 7 installed in front of the drive sprocket wheel 1 to guide the endless chain. In the remaining intermediate space between the last track roller 7 and the drive sprocket wheel 1, a guide 8 is provided according to the invention to help guide the endless chain. This guide consists of a pivoting part 9 with an outer cover 20 (FIG. 4) designed in the form of a shoe with two parallel web plates 10, 10' which serve as rails (FIG. 3). These web plates 10, 10' are to the right and to the left of the outside surfaces 11, 11' of the guide webs 5, 5' of the chain link 3 in question. On the inside surfaces 12, 12' of the web plates 10, 10' are wearing plates 13, 13', fastened by screws 14, 14'. When the pivoting part 9, as shown in FIG. 1, has been pivoted into its working position, the wearing plates 13, 13' in question come to rest against the outside surfaces 11, 11' of the associated guide webs 5, 5' to exercise their guide function. The pivoting part 9 is supported in bearing blocks 15, 15', which are attached to a frame part 16, 16'. To prevent the pivoting part 9 from rattling against the endless chain, a holder 21 is attached to the axis 17 of the pivoting part 9. A rubber spring element 18 can be installed in this holder 21 for urging the part 9 toward the working position. It is easy to recognize the condition of the wearing plates 13, 13'. If they are worn down, the threaded parts of the associated screws 14, 141 are also worn down. Because the screws 14, 14' are then no longer able to hold, they fall out of the holes 19, 19' in the web plates 10, 10' as a result of the shaking of the track-type undercarriage. This can be seen intermediately during the course of the normal daily inspection.

FIGS. 4a–4c show side, front, and top views of the pivoting part 9 as an individual element. It consists of a shoe-like curved outer cover 20 with two arms, to the bottom of which the web plates 10, 10' are attached a certain distance apart. As already mentioned, it is possible for the wearing plates 13, 13' to be connected detachably by means of screws 14, 14' to the straight section of the wearing plates 10, 10'. A holder 21 is attached to the upper right end area of the two web plates 10, 10', and the rubber spring element 18 can be installed in this holder. As an alternative, it is also possible for the rubber spring element 18 to be attached directly to the pivoting part 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A track-type undercarriage comprising an undercarriage support having a frame part, an endless chain comprising a plurality of chain links connected end to end in a direction of travel, each link comprising a pair of spaced part guide webs connected by a cog, said guide webs having a respective pair of mutually opposed outside surfaces which face transversely to said direction of travel, at least one drive sprocket wheel mounted on said undercarriage support, said drive sprocket wheel having a plurality of circumferential chain teeth, said cog engaging between said teeth, a plurality of track rollers mounted on said undercarriage support for guiding said endless chain, and a guide mounted to said frame part between said drive sprocket wheel and said track rollers, said guide being pivotable about an axis to and from a working position, said axis being transverse to said direction of travel, said guide comprising a pair of parallel guide rails having mutually facing inside surfaces which face respective said mutually facing outside surfaces of said guide webs when said guide is in said working position.

2. A track-type undercarriage as in claim 1 further comprising a pair of bearing blocks mounted to said frame part, said guide being pivotably mounted between said bearing blocks.

3. A track-type undercarriage as in claim 1 wherein said guide further comprises a holder mounted about said axis, and a rubber spring element in said holder, said rubber spring element urging said guide toward said working position.

4. A track-type undercarriage as in claim 1 further comprising a pair of wear plates detachably mounted to respective said inside surfaces of said guide rails.

5. A track-type undercarriage as in claim 4 wherein said wear plates are fastened in place by screws received through said rails and threaded into said wear plates.

* * * * *